United States Patent [19]

Blomgren

[11] Patent Number: 4,729,619
[45] Date of Patent: Mar. 8, 1988

[54] OPTICAL FIBER CONNECTOR INCORPORATING MEANS FOR ISOLATING CONNECTION FROM EXTERNAL STRESSES

[75] Inventor: Jack P. Blomgren, Red Wing, Minn.

[73] Assignee: Minnesota Mining and Manufacturing Company, St. Paul, Minn.

[21] Appl. No.: 858,030

[22] Filed: May 1, 1986

[51] Int. Cl.⁴ .................................................. G02B 6/38
[52] U.S. Cl. ................................. 350/96.21; 350/96.2
[58] Field of Search ............... 350/96.20, 96.21, 96.22, 350/96.23

[56] References Cited

U.S. PATENT DOCUMENTS

| | | | |
|---|---|---|---|
| 3,734,594 | 5/1973 | Trambarulo | 350/96 B |
| 4,078,910 | 3/1978 | Dalgoutte | 65/3 A |
| 4,110,000 | 8/1978 | Bogar et al. | 350/96.21 |
| 4,124,364 | 11/1978 | Dalgoutte | 65/4 B |
| 4,129,932 | 12/1978 | Stancati | 29/407 |
| 4,148,559 | 4/1979 | Gauthier | 350/96.21 |
| 4,220,619 | 9/1980 | Kersten | 350/96.22 |
| 4,274,708 | 6/1981 | Cocito et al. | 350/96.21 |
| 4,325,607 | 4/1982 | Carlsen | 350/96.21 |
| 4,425,375 | 1/1984 | Abramson | 427/53.1 |
| 4,445,753 | 5/1984 | Collignon | 350/96.21 |
| 4,470,180 | 9/1984 | Blomgren | 24/563 |
| 4,482,201 | 11/1984 | Dousset | 350/96.20 |
| 4,650,276 | 3/1987 | Lanzisera et al. | 350/96.2 |

FOREIGN PATENT DOCUMENTS

| | | | |
|---|---|---|---|
| 3404290 | 8/1985 | Fed. Rep. of Germany | 350/96.2 |
| 2551887 | 3/1985 | France | 350/96.2 |
| 2141252 | 12/1984 | United Kingdom | 350/96.2 |

Primary Examiner—John Lee
Assistant Examiner—John Ngo
Attorney, Agent, or Firm—Donald M. Sell; James A. Smith; Robert H. Jordan

[57] ABSTRACT

A simplified and low cost optical fiber connector incorporating strain relief means comprising a hollow housing within which a connection of optical fibers is isolated and stabilized from external strains and stresses by chocks located at opposing ends of the passageway through the housing which releasably secure the fibers in cooperation with the housing. The novel connector may be used with both polymeric and glass optical fibers, and with optical fibers which have or do not have buffer coatings. The novel connector may also be used to provide optical fiber connections incorporating strain relief means to a fiber optic splitter, a fiber optic coupler, and an opto-electronic package.

12 Claims, 4 Drawing Figures

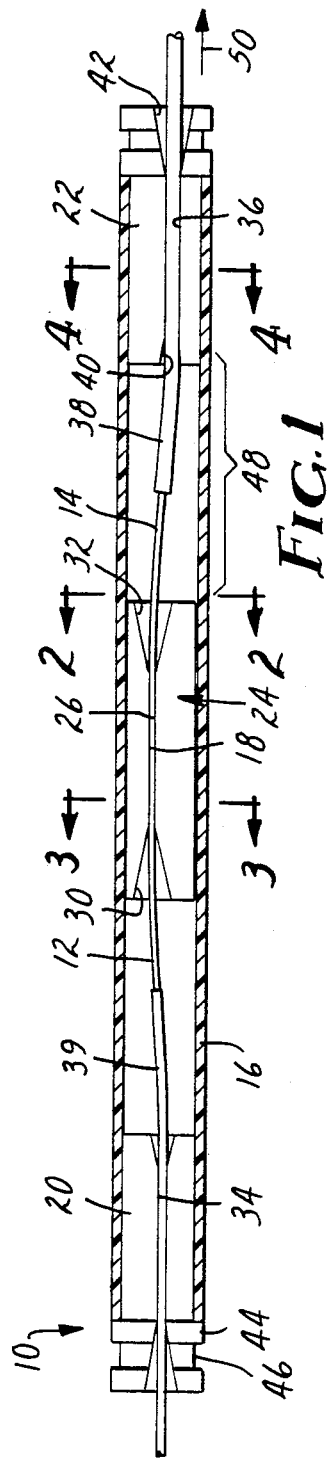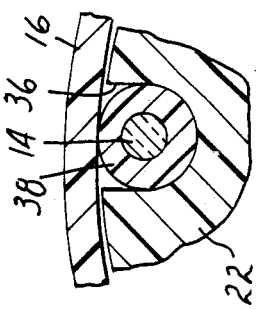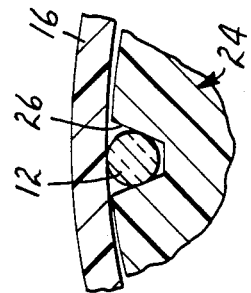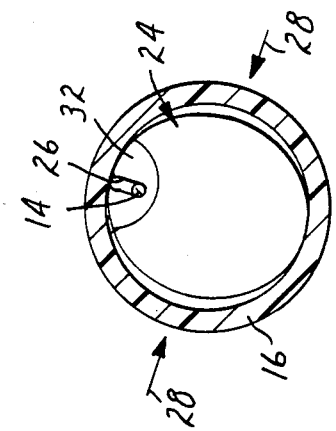

OPTICAL FIBER CONNECTOR INCORPORATING MEANS FOR ISOLATING CONNECTION FROM EXTERNAL STRESSES

FIELD OF INVENTION

This invention concerns an optical fiber connector, and in particular, concerns an optical fiber connector incorporating strain relief means for isolating and stabilizing an optical fiber connection from external strains.

BACKGROUND

The need for forming butt joints or splices of optical fibers which are used in rommunications networks, integrated optical systems, illuminators, imaging bundles, scanner displays, opto-electronic systems, night vision systems and the like is well known. Various means of securing optical fibers in proper alignment and proximity while joining or splicing the same have been suggested. Two fibers which are to be spliced may be inserted into opposite ends of a channel through ar elastomeric member which secures them in place, as disclosed in Trambarulo, U.S. Pat. No. 3,734,594, and Carlsen, U.S. Pat. No. 4,325,607. Alternatively, the fibers may be aligned within an alignment groove, or duct defined by two or more juxtaposed cylinders, and secured there, e.g., by a retaining member, as in Cocito et al., U.S. Pat. No. 4,274,708; a cable clamp as in Gauthier, U.S. Pat. No. 4,148,559; or a heat-contractable sleeve as in Stancati, U.S. Pat. No. 4,129,932. Dalgoutte, in U.S. Pat. Nos. 4,078,910 and 4,124,364, discloses the use of a heat-collapsed glass sleeve to align and secure optical fibers which are to be joined. Blomgren, U.S. Pat. No. 4,470,180, discloses a device wherein two optical fibers may be secured in connective alignment by a deformable housing having first and second interior wall portions defining an interior passageway therethrough.

Such devices, however, are often too complicated for convenient use in the field, or too bulky for use in the restricted spaces where optical fibers are typically used. Many provide connections which are subject to damage from external strains, e.g., longitudinal stresses on one of the fibers may pull the spliced fibers apart or from proper alignment so as to impair or prevent the efficient transmission of a signal through the splice.

SUMMARY OF INVENTION

The present invention provides a simple and inexpensive optical fiber connector incorporating strain relief means. With the novel connector, one or more optical fibers may be releasably secured in proper alignment to enable efficient transmission of a signal through a connection, e.g., a splice. The connector incorporates strain relief means for isolating and stabilizing the optical fiber connection from external strains, thereby reducing the likelihood of a failure, e.g., the fiber may be pulled out of proper alignment with the connection or may be damaged or broken by the stresses exerted upon it, resulting in attenuation or total loss of the signal.

The novel connector of the invention may be used with both glass optical fibers and polymeric optical fibers, and may be used with optical fibers which are provided with protective plastic buffer coatings, often provided on glass optical fibers. The novel connector may be used to provide such optical fiber connections as a splice of two fibers, a fiber coupler, a fiber splitter, or a connection to some transitional device such as an optical or opto-electronic package.

Briefly summarizing, a general embodiment of the novel connector of the invention comprises an elongate, resiliently deformable housing with a passageway therethrough and a pair of chocks located at opposing ends of the passageway. The housing is deformable by the application of a compressive force, and is resiliently deformable in that after the compressive force is removed, it will tend to return to its original contour. The chocks are each adapted to releasably secure one or more optical fibers in cooperation with said housing. In a preferred embodiment, the connector further comprises a mandrel disposed within the passageway between the two chocks which provides means for aligning the fibers.

A splice of two optical fibers is assembled by inserting a first fiber into a first end of the passageway of the housing and into the alignment groove of the mandrel, if any, and securing the fiber with a first chock. Before the fiber is secured with the chock, an excess of fiber is provided between the mandrel and the chock. The second fiber is similarly inserted into the opposing ends of the passageway and alignment groove of the mandrel and secured with the second chock. Once so assembled, the splice is effectively isolated and stabilized within the housing from any external strains such as a longitudinal tug on one of the fibers, which might tend to pull the spliced fibers apart or out of proper optical alignment.

BRIEF DESCRIPTION OF THE DRAWING

The present invention will be further described hereinafter with reference to the accompanying drawing wherein;

FIG. 1 is a side view with housing portion sectioned of a connector of the invention used to provide a splice of two optical fibers;

FIG. 2 is a cross-sectional view of the optical fiber connector of FIG. 1 taken along axis 2—2 perpendicularly to the perspective of FIG. 1 showing the profile of the passageway of the housing, and the mandrel which in cooperation therewith provides means for aligning the two optical fibers being spliced;

FIG. 3 is a partial cross-sectional view of the optical fiber connector of FIG. 1 taken along axis 3—3 perpendicularly to the perspective of FIG. 1 showing an optical fiber secured in the alignment groove of the mandrel by the mandrel in cooperation with the housing; and FIG. 4 is a partial cross-sectional view of the optical fiber connector of FIG. 1 taken along axis 4—4 perpendicularly to the perspective of FIG. 1 showing an optical fiber having a buffer coating which is releasably secured in the reception groove of a chock by the chock in cooperation with the housing.

These figures, which are not to scale, are illustrative only and are intended to be nonlimiting.

DETAILED DESCRIPTION OF THE INVENTION

One embodiment of an optical fiber connector 10 according to the present invention used to provide a splice incorporating strain relief means of two optical fibers 12, 14 is illustrated in FIG. 1. Therein is shown hollow, elongate, generally cylindrical housing 16 with splice 18 of fibers 12, 14 contained within. Housing 16 is preferably constructed from a polymeric material which is resiliently deformable, i.e., a material which will tend to return to its original shape after being deformed, and which has a low creep, i.e., a material which will tend to resist permanent deformation when subjected to a steady load, examples thereof including polycarbonates, polysulfones, polyacrylates, polyetherimides, and polyimidesulfones. Useful materials should exhibit substantial dimensional stability at temperatures from about −40° C. to about 90° C., the ambient temperature range at which optical fibers are generally used, and preferably resist attack by any chemicals to which connector 10 may be exposed. Materials which are also extrudable or moldable into the present configuration can further reduce the cost of the device, thereby adding to the advantages offered by the present invention.

Housing 16 is preferably transparent to visible light so that insertion of fibers 12, 14 and their proper alignment at splice 18 can be visually monitored. If desired, a lens element (not shown) may be incorporated into housing 16 in the region proximate to where splice 18 is located to facilitate visual monitoring of the insertion of fibers 12, 14 and inspection of splice 18.

Housing 16 is preferably also transparent to an appropriate radiation source to permit the radiation curing of an adhesive, such as those disclosed in U.S. Pat. Nos. 4,425,375; 4,445,753; and 4,482,201, which may be used to secure splice 18, chocks 20, 22, or mandrel 24.

Located inside the passageway of housing 16, generally towards the middle thereof, is mandrel 24 which has an alignment groove 26 wherein spliced fibers 12, 14 are secured in proper alignment and proximity for an optically efficient splice of their butt ends. Referring to FIG. 2, whereas the passageway of housing 16 is generally cylindrical, mandrel 24 is typically an ovate shaped body with the longest axis thereof being greater than, and the thinnest axis thereof being less than, the at-rest diameter of the passageway. Mandrel 24 is preferably very rigid and should be substantially dimensionally stable at temperatures to which the connection is likely to be subject. Examples of suitable materials include moldable ceramics such as steatites, calcium titanate, or silicon nitride, and highly filled thermoset plastics such as carbon- or glass-filled epoxies.

Mandrel 24 is inserted into the passageway of housing 16 by applying an external compressive force 28 to housing 16 approximately parallel to the shorter axis of mandrel 24. Compressive force 28 causes housing 16 to deform inwardly at the points of application resulting in the relatively outwardly movement of housing 16 approximately parallel to the longer axis of mandrel 24. Mandrel 24, which is freely moveable within the passageway of housing 16 as external compressive force 28 is continuously applied, is moved to its desired location, generally towards the middle of the passageway of housing 16 whereupon force 28 is released. Resiliently deformable housing 16 tends to return to its initial configuration and grips mandrel 24 securely within.

Alignment groove 26, which is located on one side of ovate-shaped mandrel 24, preferably on the longest axis thereof, preferably has a substantially V-shaped profile of sufficient width in relation to the diameter of the optical fibers being spliced that, when inserted into groove 26, the optical fibers protrude slightly above the surface of mandrel 24 in intimate contact with the inner wall of housing 16, as shown in FIG. 3. Thus fiber 12 is securely supported in proper optical alignment for an efficient splice with the second fiber (14 as shown in FIG. 1) by mandrel 24 in cooperation with housing 16. An alignment groove 26 having a V-shaped profile provides positive, three-point contact between fiber 12, and mandrel 24 and housing 16 which cooperatively secure it, and may be conveniently provided by molding, machining, extruding, or profile grinding.

Referring again to FIG. 1, preferably the ends of alignment groove 26 are flared to conical openings 30, 32 to facilitate insertion of optical fibers 12, 14 therein. In FIG. 2, fiber 14 is shown extending into conical opening 32 from alignment groove 26 where it is secured by mandrel 24 in cooperation with housing 16.

Chocks 20, 22 are also ovate shaped bodies which are inserted into opposing ends of housing 16 with application of a compressive force and secured there in similar fashion as mandrel 24. Chocks 20, 22 are constructed from materials such as polycarbonates and acrylics, which offer mechanical integrity and dimensional stability while providing firm support to optical fibers 12, 14. Whereas housing 16 should be resiliently deformable, chocks 20, 22 are preferably quite rigid. Each chock 20, 22 is adapted to releasably secure at least one optical fiber in a reception groove 34, 36 in cooperation with the inner wall of housing 16 in the same fashion as mandrel 24.

With reference to FIG. 4, if optical fiber 14 being releasably secured has a buffer coating 38, reception groove 36 is preferably C-shaped or a partial cylinder, the diameter of which is slightly larger than the outer diameter of buffer coating 38. Reception groove 36 is sufficiently shallow that buffer coating 38 protrudes slightly above the surface of chock 22 in intimate contact with the inner wall of housing 16. Buffer coating 38 may conform slightly to assume the contour of reception groove 36, and fiber 14 is releasably secured therein by chock 22 in cooperation with housing 16. If the optical fiber being secured does not comprise a buffer coating, the reception groove is preferably V-shaped in the same fashion as alignment groove 26 of mandrel 24 as shown in FIG. 3. If fiber 14 has a buffer coating 38, reception groove 36 is preferably not V-shaped because the tendency of buffer coating 38 to deform may tend to prevent fiber 14 from being secured sufficiently firmly, allowing fiber 14 to slip. Any such tendency of fiber 14 to slip may interfere with the stabilization against external strain provided the connection by connector 10.

Referring again to FIG. 1, reception grooves 34 and 36 may be of different size to releasably secure optical fibers 12, 14 of different outer diameter, e.g., fibers having buffer coatings 38, 39 of different thicknesses or a fiber having a buffer coating which is being connected to a fiber having no buffer coating. To facilitate insertion of optical fiber 14, and seating of chock 22 within the housing 16, each end of reception groove 36 may have a flared or conical opening 40, 42.

Preferably, chocks 20 and 22 are provided with means for preventing overinsertion into housing 16. For instance, chock 20 is shown with shoulder 44 which has a diameter greater than that of the body of chock 20 or the passageway of housing 16. Alternative means for preventing overinsertion, which may prevent subsequent disassembly of the connection, may be provided by a protrusion (not shown) on the chock which extends to mandrel 24, or may be omitted if desired as it is merely a preferred attribute to the invention.

Preferably, chocks 20 and 22 are also provided with means for easy handling and adjustment. For instance, chock 20 is shown with notch 46 which provides means for gripping chock 20 with a hand tool, e.g., tweezers or needlenose pliers (not shown).

According to the invention, a splice of two optical fibers is assembled as follows. The buffer coating 38, if one is present, is removed from at least that portion of first fiber 14 which will extend into alignment groove 26. The buffer on that portion of fiber 14 which is secured within reception groove 36 of first chock 22 is preferably left intact. The bared end of fiber 14 is then gently introduced into housing 16 and inserted into alignment groove 26 of mandrel 24 as a compressive force (28 in FIG. 2) is applied. Fiber 14 is typically inserted to approximately the middle point of alignment groove 26 whereupon the compressive force is released, but may be inserted to any point within groove 26 such that each fiber 12, 14 is sufficiently secured to provide the proper alignment for an optically efficient splice 18.

It may be desirable to provide an effective amount of an index matching material (not shown), typically in the form of a gel, to ensure an optically efficient splice of fibers 12, 14, e.g., DuSil SG-308, a silicone-based coupling compound available from Ducey Chemical, Inc. Such materials enable the splicing of optical fibers which have irregular ends or which are not butted together precisely. Index matching materials which also act as an adhesive and are photo or ultraviolet curable are preferred. Such materials are often silicone-based, examples thereof including Norland Optical Adhesive No. 61 or 81, available from Norland Products, Inc.

The end of housing 16 through which first fiber 14 was inserted is then subjected to a compressive force as chock 22 is inserted with fiber 14 arranged in reception groove 36. Preferably, after fiber 14 is inserted into alignment groove 26 of mandrel 24 and chock 22 is inserted into housing 16, chock 22 is rotated slightly within housing 16 to provide a shallow "S" curve 48 to the fiber between chock 22 and mandrel 24. This shallow "S" curve provides a small but important amount of slack which can be used to compensate for any longitudinal motion or displacement of fiber 14 with respect to connector 10, such as by tensile stresses caused by mechanical forces or expansion and contraction of housing 16 with ambient temperature variations. When the compressive force is released, deformable housing 16 tends to return to its initial shape, thereby securing optical fiber 14 in cooperation with chock 22.

If desired, an adhesive (not shown) may be used to more securely anchor chock 22 and fiber 14. An adhesive further insures that fiber 14 does not slip in reception groove 36 when external stress is applied to the fiber. Also, with such adhesives, optical fiber connectors of the invention may be assembled so as to be hermetically sealed to provide a fiber optic connection which is not subject to environmental degradation. For instance, moisture penetration into connector 10 may cause condensation on spliced fibers 12, 14, thereby interfering with the optical relationships necessary for an optically efficient splice. Also, the optical properties of some optical fibers, especially polymeric fibers, may be altered as the fiber absorbs moisture, resulting in attenuation of a signal which is transmitted through the fiber. Suitable adhesives include epoxies, cyanoacrylates, and such hot melts as copolyamides and copolyesters. The choice of adhesive is in part dependent upon the materials selected for housing 16 and chock 22. If a splice which may be disassembled at a later time is desired, the adhesive should be selected accordingly, e.g., a hot melt which can be heated to release chock 22 and optical fiber 14 from housing 16.

Second fiber 12 is similarly inserted into the opposing end of housing 16 and secured in similar fashion with second chock 20.

Before insertion of chocks 20, 22, it may be desirable to fill the passageway within hollow housing 16 with a sealant (not shown), such as silicone gel, to provide a more secure hermetic seal around splice 18.

Once assembly is complete, splice 18 is isolated and stabilized within connector 10 from any external strains. An external strain or stress applied to either fiber, such as a longitudinal tug in the direction of arrow 50, is transmitted from first fiber 14 to second fiber 12 via housing 16 without disturbing splice 18.

The invention may also be used to provide optical fiber connections other than the above-described splice. For instance, a connector of the invention may be used to provide a fiber optic splitter wherein a first fiber is split into a pair of fibers. Accordingly, the chock releasably securing the pair of fibers should be adapted to secure both fibers, e.g., with two reception grooves disposed on opposing sides of the body of the chock. To provide a fiber optic coupler wherein the signal in one optical fiber is transferred to a second optical fiber, each chock is typically adapted to releasably secure at least two optical fibers. Another example is a connection of an optical fiber with an opto-electronic package, e.g., a device which converts a light signal to an electrical signal, wherein the opto-electronic package is located within the passageway of the connector housing, and is typically secured in similar fashion as the mandrel discussed above, a first chock releasably secures at least one wire which is connected to the opto-electronic package, and the second chock releasably secures at least one optical fiber which is connected to the opto-electronic package.

Other useful applications of this invention will be obvious to those skilled in the art.

What is claimed is:

1. An optical fiber connector comprising:
   (A) an elongate, resiliently deformable housing with a passageway therethrough;
   (B) a first chock, secured within said passageway proximate to a first end of said housing and adapted to releasably secure at least a first optical fiber in cooperation with said housing; and
   (C) a second chock, secured within said passageway proximate to a second end of said housing and adapted to releasably secure at least a second optical fiber in cooperation with said housing;
   whereby a connection of said optical fibers located within said passageway is isolated and stabilized from stresses external to said housing.

2. A connector as defined in claim 1 wherein at least one of said chocks is secured with an adhesive.

3. A connector as defined in claim 2 wherein said adhesive is radiation curable.

4. A connector as defined in claim 3 wherein said housing is substantially transparent to curing radiation.

5. A connector as defined in claim 1 wherein said housing is substantially transparent to visible light.

6. A connector as defined in claim 5 wherein said housing further comprises a lens element.

7. A connector as defined in claim 1 wherein said first chock is adapted to releasably secure an optical fiber of different outer diameter than the optical fiber which said second chock is adapted to releasably secure.

8. A connector as defined in claim 1 further comprising:

(D) a mandrel, located within said passageway between said first and second chocks and adapted to receive and support said optical fibers in proper optical alignment.

9. A connector as defined in claim 1 wherein said passageway is filled with a sealant.

10. A connector as defined in claim 1 wherein said second chock is adapted to secure two optical fibers and said connection is an optical fiber splitter.

11. A connector as defined in claim 1 wherein said first chock and said second chock are each adapted to secure at least two optical fibers and said connection is an optical fiber coupler.

12. An optical fiber connector comprising:

(A) an elongate, resiliently deformable housing with a passageway therethrough;

(B) a first chock, secured within said passageway proximate to a first end of said housing and adapted to releasably secure at least one wire in cooperation with said housing;

(C) a second chock, secured within said passageway proximate to a second end of said housing and adapted to releasably secure at least one optical fiber in cooperation with said housing; and (D) an opto-electronic package, located within said passageway between said first and second chocks, to which said wire and said optical fiber are connected;

whereby the connections of said wire and said optical fiber to said opto-electronic package are isolated and stabilized from stresses external to said housing.

* * * * *

UNITED STATES PATENT AND TRADEMARK OFFICE
CERTIFICATE OF CORRECTION

PATENT NO. : 4,729,619
DATED : March 8, 1988
INVENTOR(S) : Jack P. Blomgren

It is certified that error appears in the above-identified patent and that said Letters Patent is hereby corrected as shown below:

In Column 1, line 14 "rommunications" should be --communications--.

In Column 1, line 21 "ar" should be --an--.

Signed and Sealed this

Sixteenth Day of August, 1988

Attest:

Attesting Officer

DONALD J. QUIGG

Commissioner of Patents and Trademarks